United States Patent [19]

Gabathuler et al.

[11] Patent Number: 4,913,712
[45] Date of Patent: Apr. 3, 1990

[54] FILTER FOR CLEANING EXHAUST GASES OF DIESEL ENGINES

[75] Inventors: Jean-Pierre Gabathuler, Schleitheim; Tiberiu Mizrah, Schaffhausen, both of Switzerland; Manfred Doll, Neustadt; Harald Bressler, Westheim, both of Fed. Rep. of Germany

[73] Assignee: Swiss Aluminium Ltd., Chippis, Switzerland

[21] Appl. No.: 271,060

[22] Filed: Nov. 14, 1988

[30] Foreign Application Priority Data

Nov. 18, 1987 [CH]  Switzerland .................. 4505/87
Dec. 23, 1987 [CH]  Switzerland .................. 5050/87

[51] Int. Cl.⁴ .............................................. F01N 3/02
[52] U.S. Cl. ........................................ 55/482; 55/484; 55/523; 55/DIG. 30; 60/311
[58] Field of Search ............... 55/482, 484, 498, 523, 55/DIG. 30; 60/311

[56] References Cited

U.S. PATENT DOCUMENTS

| | | | |
|---|---|---|---|
| 2,338,345 | 1/1944 | Mather | 55/484 |
| 3,154,388 | 10/1964 | Purse | 55/DIG. 30 |
| 3,222,140 | 12/1965 | Scivally et al. | 55/DIG. 30 |
| 3,380,810 | 4/1968 | Hamblin | 55/DIG. 30 |
| 3,811,845 | 5/1974 | Nakamura | 55/DIG. 30 |
| 4,264,346 | 4/1981 | Mann | 55/DIG. 30 |
| 4,419,113 | 12/1983 | Smith | 60/311 |
| 4,504,294 | 3/1985 | Brighton | 55/DIG. 30 |
| 4,629,483 | 12/1986 | Stanton | 55/523 |
| 4,673,423 | 6/1987 | Yumlu | 55/484 |
| 4,732,594 | 3/1988 | Mizrah et al. | 60/311 |
| 4,813,231 | 3/1989 | Bykowski | 55/DIG. 30 |

FOREIGN PATENT DOCUMENTS

| | | |
|---|---|---|
| 0216729 | 4/1987 | European Pat. Off. . |
| 1476620 | 2/1969 | Fed. Rep. of Germany . |
| 2164771 | 7/1972 | Fed. Rep. of Germany . |
| 2856471 | 8/1980 | Fed. Rep. of Germany ........ 55/523 |
| 2109753 | 5/1972 | France . |
| 2199344 | 4/1974 | France . |
| 700176 | 12/1979 | U.S.S.R. .............................. 55/523 |

Primary Examiner—Jay H. Woo
Assistant Examiner—C. Scott Bushey
Attorney, Agent, or Firm—Bachman & LaPointe

[57] ABSTRACT

In a filter consisting of hollow cylindrical open-pore ceramic foam and an end plate made of gas-impermeable material, as an insert in a filter cup for cleaning exhaust gases of diesel engines, in which the exhaust gases flow through the active filter section essentially perpendicularly to the cylinder axis, a larger ceramic foam portion such as is used e.g. as an exhaust filter for a diesel engine for a truck or passenger service bus can be made from one piece only with increased requirements, because the necessary dimensional accuracy necessitates increased requirements, and hence the economy of using the ceramic foam is greatly impaired. Also, the back pressure increases considerably. In a filter of this type these disadvantages are avoided by providing a filter which includes two or more axially arranged ceramic foam cylinder elements between which is located a lamella made of gas-impermeable material with at least approximately the same diameter as the ceramic foam cylinder elements and with at least one opening in the ceramic foam cylinder-free region.

14 Claims, 4 Drawing Sheets

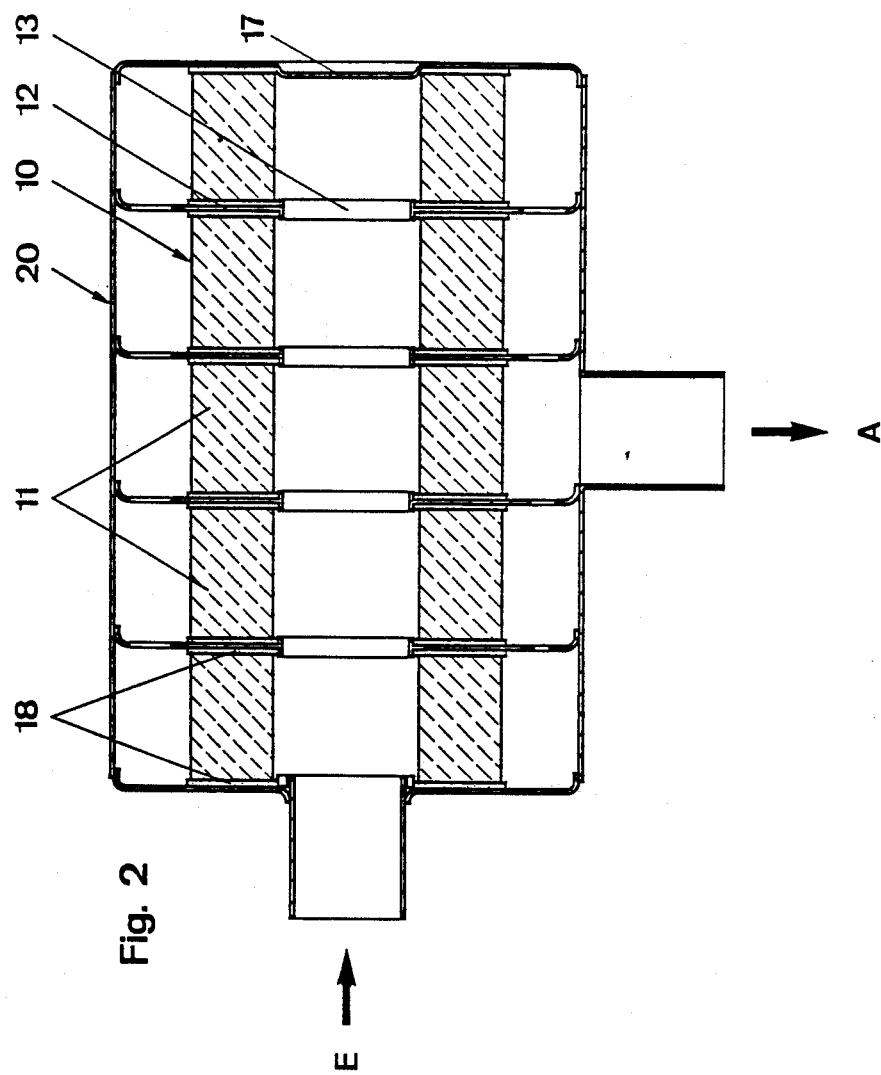

FILTER FOR CLEANING EXHAUST GASES OF DIESEL ENGINES

BACKGROUND OF THE INVENTION

The present invention relates to a filter as an insert in a filter cup consisting of hollow cylindrical open-pore ceramic foam and an end plate of gas-impermeable material for cleaning exhaust gases of diesel engines, in which the exhaust gases flow through the active filter section essentially perpendicularly to the cylinder axis.

A filter of the aforementioned kind is known from European patent application 0 216 729.

The soot components of the exhaust gases of diesel engines can basically be reduced in two ways: by optimizing mixture preparation and the combustion process in the engine and by fitting filters in the exhaust stream. Depending on the design of the filter, usually degrees of soot precipitation of 50-90% are obtained.

The active filter volume cannot however be increased as desired to obtain optimum soot precipitation, for the filter acts as a resistance which generates a back pressure counter to the exhaust gas. The back pressure must not be too high, as otherwise the engine power is reduced and fuel consumption is increased. For example, in diesel engines which are used in motor vehicles for road use, particularly passenger cars, and which are fitted with exhaust filters, the back pressure should be not more than 0.2 bar.

On account of the size of the diesel engines for trucks and passenger service buses, particularly large exhaust filters are needed. In this case there is the problem that both larger ceramic foam components can be made from one piece only with increased requirements because the necessary dimensional accuracy necessitates increased expenditure and hence the economy of using ceramic foam is greatly impaired. In addition the back pressure increases considerably as with conventional structural measures as shown e.g. by U.S. Pat. No. 4 264 346, in which the exhaust gases impinge on the end face of a cylindrical ceramic foam piece and flow through it parallel to its axis (axially).

SUMMARY OF THE INVENTION

In view of the above circumstances, the inventors set themselves the object of providing a filter of the kind mentioned hereinbefore, which both allows easy manufacture and causes a low back pressure.

According to the invention, the set object is achieved by a filter consisting of hollow cylindrical open-pore ceramic foam and an end plate made of gas-impermeable material for cleaning exhaust gases of diesel engines, in which the exhaust gases flow through the active filter section essentially perpendicularly to the cylinder axis, as an insert in a filter cup, characterized in that the filter consists of two or more axially arranged ceramic foam cylinder elements between which is located a lamella made of gas-impermeable material with at least approximately the same diameter as the ceramic foam cylinder elements and with at least one opening in the ceramic foam cylinder-free region.

The filter according to the invention has the advantage that several small ceramic foam cylinder elements are used, which can be made economically and with dimensional accuracy, and on account of the large filter surface area over which the exhaust gas flow, due to the resulting low linear gas velocity, there is high filter efficiency. Furthermore, due to the individual design of the separate lamellae or ceramic foam cylinders, the opening cross-sectional area thereof can be varied and hence the exhaust flow for each filter element can be adjusted, so that uniform cleaning efficiency of exhaust gases is obtained over the whole filter.

The linear velocity of the exhaust gas with the filter according to the invention is below 10 m/s, and the back pressure is below 0.1 bar. In case of optimum adaptation of the opening cross-sectional areas of the lamellae and the pore size of the ceramic foam cylinder elements, a linear velocity of exhaust gases of even less than 3 m/s was measured.

BRIEF DESCRIPTION OF THE DRAWINGS

Other advantages, characteristics and details of the filter according to the invention are apparent from the drawings; these show schematically:

FIG. 2 is a longitudinal section through another filter cup with filter according to the invention.

DETAILED DESCRIPTION

Figure 1:
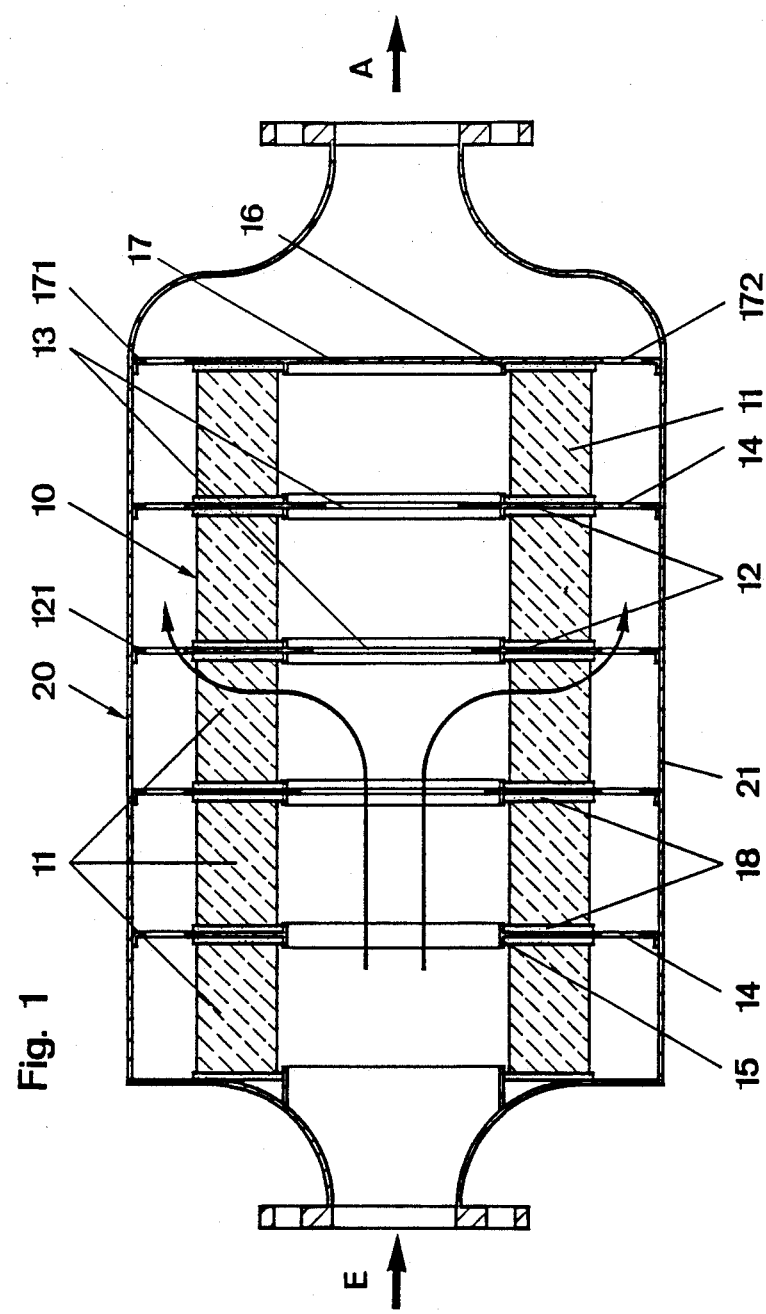
FIG. 1 is a longitudinal section through a filter cup with filter according to the invention.

The filter 10 consists of a system of several relatively short ceramic foam cylinder elements 11 which are arranged axially. The elements 11 are essentially retained in the axial direction by compression. Between the elements 11 is located in each case a lamella 12 with opening 13 and at the end an end plate 17. The compressive force can be produced advantageously by, apart from mechanical means, packings 18 which flank the lamellae 12. The packings 18 are advantageously made of heat-resistant ceramic material which is elastic or expands at elevated temperatures such as occur for example by using the filter—hence referred to as swelling or expaning mats,— whereby the compressive force is produced. But packings 18 made of wire mesh or the like material which produces compression are suitable too. Flow of the exhaust gases in the direction of arrow A through the openings 13 into the whole filter is made possible. According to the arrows drawn less boldly in FIG. 1, the exhaust gas flows through the individual ceramic foam cylinder elements 11 perpendicularly to the longitudinal direction of the filter, and emerges in the peripheral region between the elements 11 and inner wall 21 of the filter cup 20, where the lamellae 12 are at least partially supported on the inner wall 21 of the filter cup 20 and comprise at least one opening 14 through which the filtered exhaust gases flow and, after passing through the end plate 17 which is similarly shaped in this region with at least one opening 172, leave the filter cup 20 at the outlet A thereof.

The openings 13 and cross-sectional area(s) of the lamella 12 can preferably be varied in such a way that exhaust gas flow is approximately the same in each individual ceramic foam cylinder element. This equalization can also be promoted by adapting the opening(s) 14 and the cross-sectional areas $F_a$ accordingly and/or varying the number of pores per linear length of the individual ceramic foam cylinder elements.

For centering and support of the individual ceramic foam cylinder elements 11, the lamellae 12 in the region of the opening(s) 13 comprise tubular collars 15 arranged perpendicularly to the plane of the lamellae in the region of the inside diameter of the ceramic foam cylinder elements 11. Each collars 15 defines single openings 13 of lamella 12 arranged centrally to the cylinder axis of the ceramic foam cylinder elements 11. End plate 17 in the region of the inside diameter of the adjacent ceramic foam cylinder element 11 comprises tubular collar elements 16 arranged perpendicularly to the plane of the end plate. The lamella is advantageously made of metal, preferably special steel.

The cross-sectional areas of openings 13 of lamellae 12 may decrease in the direction of the exhaust stream. The cross-sectional areas of openings 14 of the lamellae 12 may decrease in the direction of the exhaust stream. In addition, the inside diameters of the ceramic foam cylinders 11 may decrease in the direction of the exhaust system while the outside diameters remain constant. In addition, the outside diameters of the ceramic foam cylinders 11 may increase in the direction of the exhaust stream while the inside diameters remain constant.

Figure 3A:
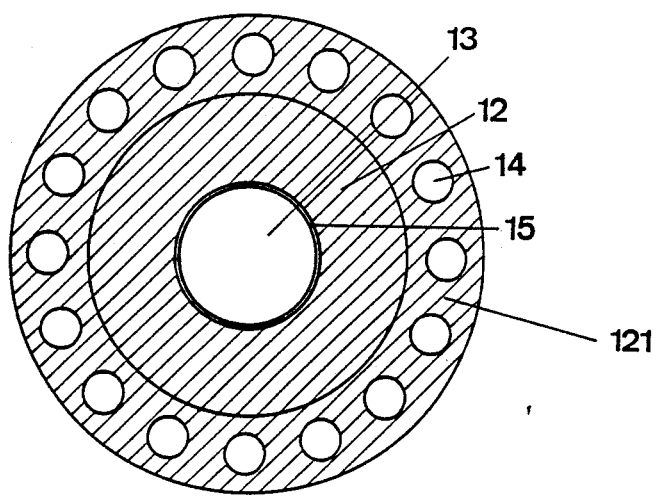
FIGS. 3a and 3b show two plans of lamellae.
Figure 3B:
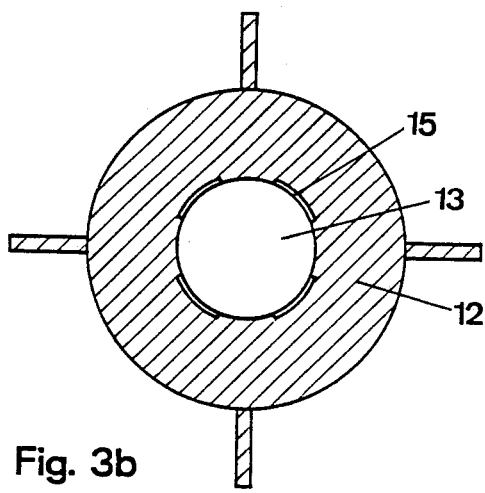

FIGS. 3a and 3b show two possible embodiments of the lamellae 12. The end plate can be designed similarly, in which case of course there is no opening 13.

Figure 4A:
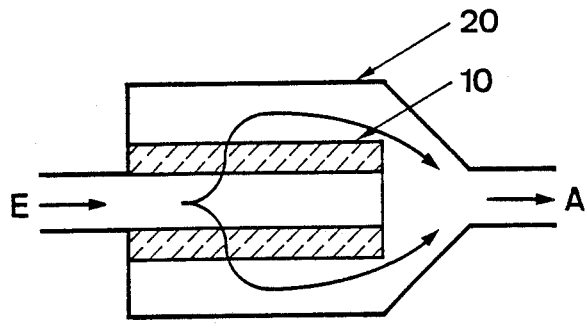
FIGS. 4a through 4d show in longitudinal section, four further developments of filter cups with the filter according to the invention.
Figure 4B:
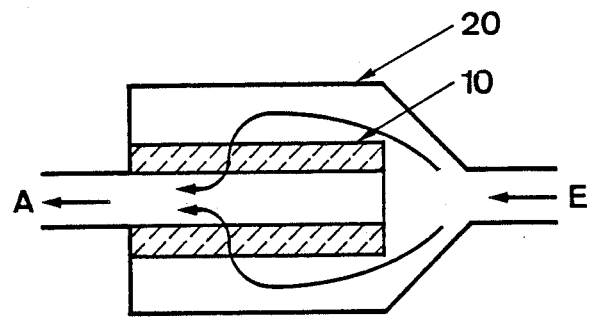
Figure 4C:
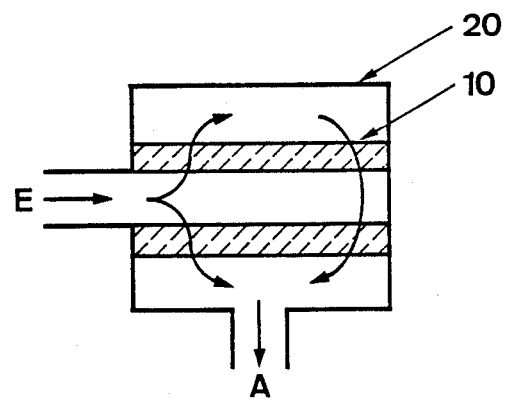
Figure 4D:
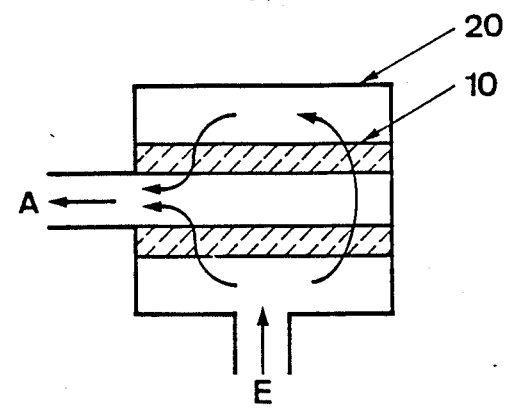

FIGS. 4a through 4b show by way of example various constructions of filter cups 20 using the filter according to the invention. The arrows indicate the direction of flow of exhaust gases from the respective inlet E to the outlet A of the filter cup 20. This shows that flow over the filter 10 can be both from the outside and from the inside, wherein in case of flow from the outside the design of the openings 14 becomes substantially significant for control of flow with the object of uniform impingement on the individual ceramic foam cylinder elements 11.

The diameter of the filter cup can vary advantageously between 120 and 500 mm in the case of a length from 100 to 1100 mm, two or ten ceramic foam cylinder elements 11 being used for the filter 10. Preferably oxides of Al, Mg and Si, particularly cordierite or mullite, individually or mixed, or silicon carbide, are used as the ceramic foam material; the pore size is preferably 30–80 pores per linear length of 1 inch. For the ceramic foam cylinder element 11, the inside diameter can vary from 30 to 250 mm, preferably 80 to 180 mm, and the outside diameter from 90 to 400 mm, preferably 150 to 300 mm, with a length of 40 to 300 mm, preferably 80 to 200 mm, and a wall thickness from 20 to 100 mm, preferably 30 to 60 mm. The ceramic foam cylinder elements 11 may have at least partly different pore numbers per linear length. The swelling mats (expanding mats) 18 are 2 to 15 mm, preferably 4 to 8 mm, thick; advantageously, sheet metal with appropriate holes or perforated sheet metal, particularly special steel, is used as the lamella, wherein support on the inner wall 21 of the filter cup 20 is effected by corresponding recesses or by elongate openings or by an appropriately designed perforated sheet.

The filter according to the invention is advantageously suitable for road and railway vehicles provided with diesel engines, in particular for trucks and passenger service buses.

We claim:

1. Filter for cleaning exhaust gases which comprises: a filter cup having an active filter section; an end plate made of gas-impermeable material as an insert in said filter cup; hollow cylindrical open-pore ceramic foam elements in said active filter section having a cylinder axis, wherein the exhaust gases flow through the active filter section essentially perpendicularly to the cylinder axis; said filter including at least two axially arranged ceramic foam cylinder elements; and a lamella between ceramic foam cylinder elements made of gas-impermeable material having at least approximately the same diameter as the ceramic foam cylinder elements and with at least one opening in the lamella spaced from the ceramic foam cylinder; a heat resisting packing flanking the lamella in the region of the ceramic foam cylinder elements to produce compressive force on said ceramic foam cylinder elements.

2. Filter according to claim 1 wherein the lamella comprises a single opening arranged centrally to the cylinder axis of the ceramic foam cylinder elements.

3. Filter according to claim 1 wherein the filter cup has an inner wall adjacent a peripheral region and the lamella is at least partially supported on the inner wall of the filter cup and comprises at least one opening in the peripheral region not enclosed by the ceramic foam cylinder elements.

4. Filter according to claim 3 wherein the end plate is at least partially supported on the inner wall of the filter cup, and comprises at least one opening in the peripheral region not enclosed by the adjacent ceramic foam cylinder elements.

5. Filter according to claim 1 wherein the lamella comprises a tubular collar perpendicularly to the plane of the lamella in the region of the inside diameter of the ceramic foam cylinder elements.

6. Filter according to claim 5 wherein the collar defines a single opening of the lamella arranged centrally to the cylinder axis of the ceramic foam cylinder elements.

7. Filter according to claim 1 wherein the end plate in the region of the inside diameter of the adjacent ceramic foam cylinder element comprises a collar segment arranged perpendicularly to its plane.

8. Filter according to claim 1 wherein the lamella is made of metal.

9. Filter according to claim 1 wherein the cross-sectional areas of the openings of the lamellae decrease in the direction of the exhaust stream.

10. Filter according to claim 1 wherein the ceramic foam cylinder elements have at least partly different pore numbers per linear length.

11. Filter according to claim 10 wherein the number of pores per inch of linear length is between 30 and 80.

12. Filter according to claim 1 wherein the inside diameters of the ceramic foam cylinders decrease in the direction of the exhaust stream while the outside diameters remain constant.

13. Filter according to claim 1 wherein the outside diameters of the ceramic foam cylinders increase in the direction of the exhaust stream while the inside diameters remain constant.

14. Filter according to claim 1 wherein said packing is made of a heat resistant ceramic material which expands at elevated temperature.

* * * * *